United States Patent [19]

Hawrylo

[11] 4,279,584
[45] Jul. 21, 1981

[54] AUTOMATIC FLASH REMOVING APPARATUS AND METHOD

[75] Inventor: Stanley F. Hawrylo, Reading, Pa.

[73] Assignee: General Battery Corporation, Reading, Pa.

[21] Appl. No.: 77,669

[22] Filed: Sep. 21, 1979

[51] Int. Cl.³ .................... B29C 27/02; B29C 17/12
[52] U.S. Cl. ................................. 425/307; 264/161; 425/806
[58] Field of Search .............. 425/806, 306, 307; 264/161

[56] References Cited

U.S. PATENT DOCUMENTS

| 3,270,116 | 8/1966 | Ruekberg | 425/806 X |
| 3,319,498 | 5/1967 | Wolford | 264/161 X |

Primary Examiner—Thomas P. Pavelko
Attorney, Agent, or Firm—Benasutti Associates, Ltd.

[57] ABSTRACT

An apparatus and method for automatically removing flash from a plastic weld bead formed around the outer periphery of a heat seal juncture between a plastic cover and container of a lead-acid battery cell. The container and cover are automatically positioned with respect to a first set of spaced, heated platens, which are then driven laterally across a first pair of opposed surfaces of the cell along the weld beads formed on these surfaces. The cell is then automatically positioned with respect to a second set of spaced, heated platens, which are then driven longitudinally across a second pair of opposed surfaces of the cell along the weld beads on these surfaces, whereupon the cell is automatically removed.

12 Claims, 6 Drawing Figures

AUTOMATIC FLASH REMOVING APPARATUS AND METHOD

BACKGROUND OF THE INVENTION

The present invention generally relates to automated lead-acid battery production equipment and in particular to a method and apparatus for automatically removing flash from weld beads on industrial lead-acid batteries cells.

Typically, during the construction of a plastic cased cell, for example of a type which form an industrial lead-acid battery, various internal elements of the cell are fitted into a plastic cell container or jar prior to sealing a plastic cell cover to that container or jar. Unlike other general heat sealing operations, the seals which are produced between the cell jar and the cell jar cover must be unusually strong and liquid tight. A failure in this seal at any point is likely to result in the leakage of acid into the environment. Finally, these seals must be of sufficient strength to withstand extreme vibration and great stress, not only due to the weight of the lead battery plates and acid electrolyte, but also by reason of the intended end uses to which the cells and the resultant storage batteries are normally subjected.

For the above described reasons, it is of particular importance to obtain even melting of those portions of the cell cover and the plastic container which are to form the heat seal between these two elements. Normally, this operation is accomplished by simultaneously melting portions of the plastic cell cover and plastic cell container using a single, heated platen, and then quickly removing the platen and pressing the container and cover together under pressure for a sufficient length of time to allow the hardening of the melted material. This operation results in the formation of a "weld bead" which normally has flash, or unwanted plastic material, extending outwardly beyond the outer surfaces of the cell container.

This flash is undesirable for a number of reasons. First, excessive flash on the outer surfaces of the container causes dimensional irregularities which are particularly undesireable in industrial battery cells since industrial batteries are normally constructed by placing a plurality of cells into a battery tray under fairly strict dimensional tolerance limitations. Consequently, a cell having excessive flash on the outer surfaces thereof, may not fit into the battery tray along with the other cells. Even if the flash on a particular cell container is not extensive, if this flash appears on all cell containers to be placed within a particular battery tray, the cumulative dimensional irregularities may prove to be prohibitive.

Second, the flash formed on the external surfaces of the battery cell adversely affects its appearance. Third, the presence of flash is very often indicative of weakened welds which are non-uniform in quality and strength along their length. These weaknesses, or potential weaknesses, can be aggravated by abrasion of the flash fragments during handling, installation or use.

SUMMARY OF THE INVENTION

The present invention provides a method and apparatus for automatically removing flash from a plastic weld bead formed by heat sealing a plastic battery cell cover to a plastic battery cell container. This accomplishment results from numerous features incorporated in applicant's novel method and apparatus.

One such feature is conveying means for automatically transportating the cell container with the cell cover sealed thereto, into position adjacent a spaced pair of laterally moveable heated platens. Another feature is the movement of the spaced, heated platens over opposite surfaces of the positioned cell along the weld bead whereby the flash and weld bead are smoothed out and pushed back against the container and cover in order to eliminate flash projections and strengthen the weld, as well as to enhance the external appearance of the cell.

Yet another feature is means for automatically transporting the cell jar into position adjacent a longitudinally moveable set of spaced, heated platens. A further feature is the movement of these spaced, heated platens over a second pair of opposed surfaces of the positioned cell along the weld bead whereby the flash and weld bead are smoothed out and pushed back against these surfaces in order to eliminate flash projections and strengthen the weld as well as to enhance the external appearance of the cell.

Another feature of the present invention is the provision of means for removing the cell from the longitudinally moveable set of spaced, heated platens. A further feature of the present invention is the provision of means to accommodate variations in the physical dimensions in various lead-acid battery cells to be processed.

Accordingly, one object of the present invention is the provision of a novel method and apparatus for automatically removing flash from a weld bead formed along the sealed juncture of a plastic battery cell container and cover.

Another object of the present invention is the provision of an apparatus for automatically positioning the lead-acid battery cell for flash removal.

A further object of the present invention is the provision of an apparatus for automatically smoothing the weld bead and associated flash by simultaneously heating the bead and flash and forcing the resultant molten plastic back against the juncture and surfaces of the cell container and cover.

An additional object of the present invention is the provision of means for accommodating lead-acid battery cell types having different external dimensions.

These and other objects of the present invention will become apparent from the following more detailed description.

DETAILED DESCRIPTION OF THE DRAWINGS

Figure 1:
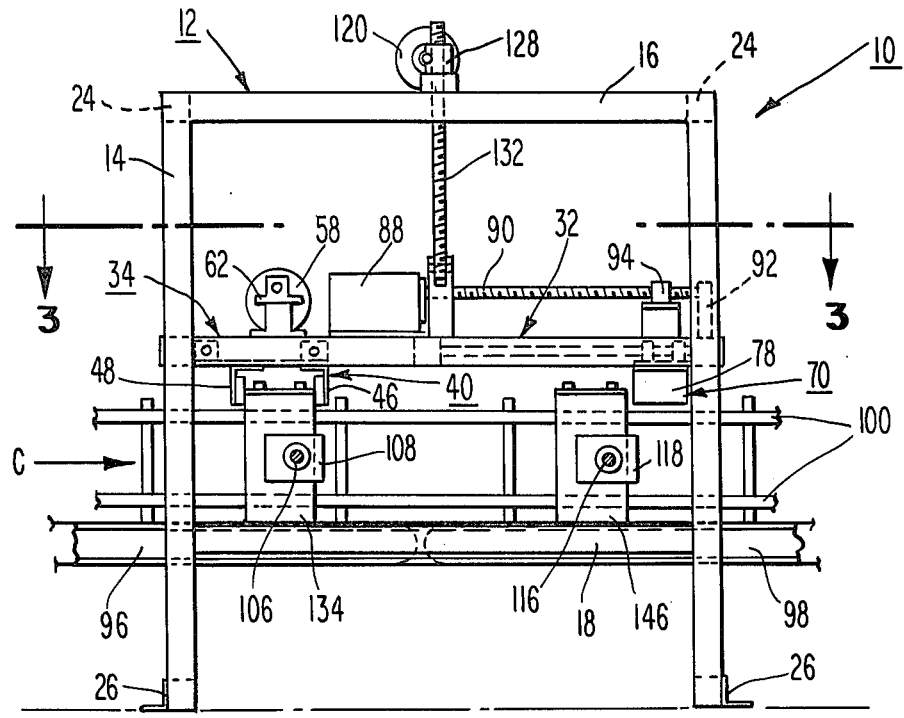
FIG. 1 is a front elevational view of a preferred embodiment of an automatic flash removing apparatus of the present invention.

Although specific forms of the invention have been selected for illustration in the drawings and the following description is drawn in specific terms for the purpose of describing these forms of the invention, this description is not intended to limit the scope of the invention which is defined in the appended claims.

Referring to FIG. 1, there is shown a preferred embodiment of an automatic flash removing apparatus of the present invention, generally designated 10. The automatic flash removing apparatus 10 comprises a main frame 12 which, in the preferred embodiment, consists of a substantially rectangular framework of tubular steel members, each having a substantially square cross section. These tubular steel members include a pair of front vertical frame members 14, which are connected together by a front top lateral frame member 16 and a front lower lateral frame member 18 both of which are rigidly attached to the front vertical frame members 14 by suitable means, such as welding. The main frame 12 also includes a pair of rear vertical frame members 20 which are connected together by a rear top lateral frame member (not shown) and a rear lower lateral frame member 22 which are rigidly attached to the rear vertical frame members 20 by suitable means such as welding. A pair of side top lateral frame members 24 and a pair of side bottom lateral members 26 are connected to the front and rear vertical frame members 14 and 20 by suitable means such as welding.

Figure 2:
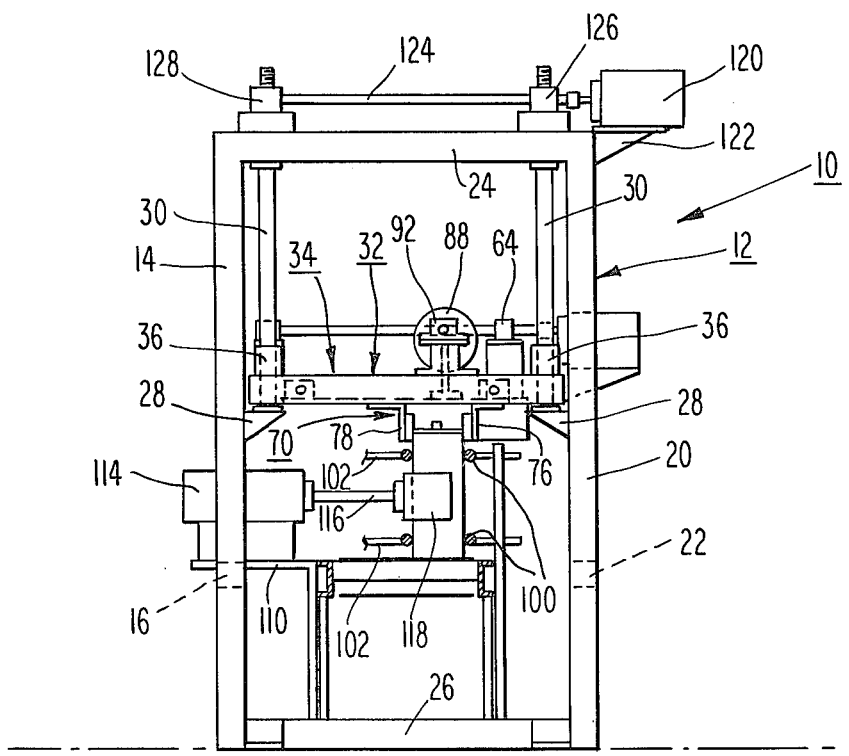
FIG. 2 is a side elevational view of the preferred embodiment of the automatic post straightening apparatus of the present invention.

Four shaft support members 28 are disposed at the corners of the main frame 12, each being rigidly attached by suitable means such as welding to a respective vertical frame member. Each shaft support member 28 has an inwardly depending support surface which is substantially co-planer with the support surfaces of the other shaft support members 28. A vertical guide shaft 30 extends upward from the shaft support surface of each shaft support member 28 to the underside of a respective side top lateral frame member 24. One end of each vertical guide shaft 30 is rigidly attached to its respective shaft support member 28 by suitable means, for example bolts; the other end of the shaft being rigidly connected to its corresponding side top lateral frame member 24 by suitable means, for example bolts in the preferred embodiment. A main head 32 is slideably mounted on the vertical guide shafts 30. The main head 32 comprises a substantially rectangular frame 34 which, in the preferred embodiment, is constructed of tubular steel members having a substantially square cross section. The main head frame 34 has four apertures, one at each corner, which are sized to receive the vertical shafts therethrough. A slide bushing 36 is mounted on each corner of the main head frame 34 in alignment with the aperture thereat. The slide bushings 36 are adapted to slideably engage the vertical guide shafts 30 which are disposed therethrough as shown in FIG. 2. This construction permits the vertical movement of the main head 32 along the vertical guide shafts 30.

A pair of lateral guide shafts 38 are attached to the main head 32 and extend between the front and rear portions of the main head frame 34. A first platen head, generally designated 40, is slideably mounted on the lateral guide shafts 38. The first platen head 40 comprises a first head plate 42 upon which are mounted slide bushings 44 adapted to receive the lateral guide shafts 38 therethrough. Consequently, the first platen head 40 is moveable from front to back within the main head frame 34 along the lateral guide shafts 38.

A first fixed heated platen 46 is fixedly attached to the underside of the first head plate 42 by suitable attachment means, such as bolts. A first moveable heated platen 48 is attached to the underside of the first head plate 42 in parallel spaced relation with the first fixed heated platen 46. The first moveable heated platen 48 has a pair of guide pins (not shown) extending from the top thereof which are adapted to engage any one of a series of pairs of receiving apertures 50 in the first head plate 42. The first moveable heated platen 48 also includes a threaded rod 52 extending from the top thereof through an elongated slot 54 in the first head plate 42. A first hand-operated tightening nut 56 is threaded onto the threaded rod 52. Consequently, the first moveable heated platen 48 can be moved to any one of a number of predetermined positions, each of which is defined by a pair of apertures 50, by placing the guide pins of the first moveable heated platen 48 within these apertures. The first hand-operated tightening nut 56 is then tightened in order to maintain the moveable platen 48 fixed in that particular position. These predetermined positions define predetermined spacings between the first fixed heated platen 46 and the first moveable heated platen 48 in order to accommodate different size battery cells.

A first reversible electric motor 58 is mounted on the main head frame 34 by suitable attachment means such as bolts. A first threaded rod 60 is attached to the shaft of the first reversible electric motor 58 by suitable rigid coupling means. The end of the first threaded rod 60 opposite the electric motor 58 is connected to a rotating bearing 62 which is attached to the main head frame 34 in substantial alignment with the axis of the shaft of the electric motor 58, thereby providing support for, and maintaining alignment of the first threaded rod 60. A first threaded bushing 64, adapted to receive and threadingly engage the first threaded rod 60, is attached to the first head plate 42. As a result, rotation of the first threaded rod 60 in one direction by the first reversible electric motor 58 will cause the first platen head 40 to move along the lateral guide shafts 38 in a first direction, for example that indicated by arrow "A". In addition, rotation of the first threaded rod 60 in the opposite direction by the first reversible electric motor 58 will cause the first platen head 40 to move, along the lateral guide shafts 38 in the direction opposite to that indicated by arrow "A".

A lateral main head frame member 66 is attached to the main head 32 and extends between the front and rear portions of the main head frame 34 substantially midway between the ends thereof. A pair of longitudinal guide shafts 68 are attached to the main head 32 and extend between the side thereof opposite the lateral guide shafts 38 and the lateral main head frame member 66. A second platen head, generally designated 70, is slideably mounted on the longitudinal guide shafts 68. The second platen head 70 comprises a second head plate 72 upon which are mounted slide bushings 74 adapted to receive the longitudinal guide shafts 68 therethrough. Consequently, the second platen head 70 is moveable from side to side within the main head frame 34 along the longitudinal guide shafts 68.

A second fixed heated platen 76 is fixedly attached to the underside of the second head plate 72 by suitable attachment means, such as bolts. A second moveable heated platen 78 is attached to the underside of the second head plate 72 in parallel spaced relation with the second fixed heated platen 76. The second moveable heated platen 78 has a pair of guide pins (not shown) extending from the top thereof which are adapted to engage any one of a series of pairs of receiving apertures 80 in the second head plate 72. The second moveable heated platen 78 also includes a threaded rod 82 extending from the top thereof through an elongated slot 84 in the second head plate 72. A second hand operated tightening nut 86 is threaded onto the threaded rod 82. Consequently, the second moveable heated platen 78 can be moved to any one of a number of predetermined positions, each of which is defined by a pair of apertures 80, by placing the guide pins of the second moveable heated platen 78 within these apertures. The second hand operated tightening nut 86 is then tightened in order to maintain the second moveable platen 78 fixed in that particular position. These predetermined positions define predetermined spacings between the second fixed heated platen and the second moveable heated platen 78 in order to accommodate different size battery cells.

A second reversible electric motor 88 is mounted on the main head frame 34 by suitable attachment means such as bolts. A second threaded rod 90 is attached to the shaft of the second reversible electric motor 88 by suitable rigid coupling means. The end of the second threaded rod 90 opposite the electric motor 88 is connected to a second rotating bearing 92 which is attached to the main head frame 34 in substantial alignment with the axis of the shaft of the second reversible electric motor 88, thereby providing support for, and maintaining alignment of the second threaded rod 90. A second threaded bushing 94, adapted to receive and threadingly engage the second threaded rod 90, is attached to the second head plate 72. As a result, rotation of the second threaded rod 90 is one direction by the second reversible electric motor 88 will cause the second platen head 70 to move along the longitudinal guide shafts 68 in a first direction, for example that indicated by arrow "B". In addition, rotation of the second threaded rod 90 in the opposite direction by the second reversible electric motor 88 will cause the second platen head 70 to move along the longitudinal guide shafts 68 in the direction opposite to that indicated by arrow "B".

Conveying means, comprising a first belt conveyor 96 and a second belt conveyor 98 is disposed within the automatic flash removing apparatus 10 under the main head 32. The belt conveyors 96 and 98 convey the cells along a processing line into position under the first platen head 40 and second platen head 70 in the direction indicated by arrow "C" in FIG. 1. In the preferred embodiment, the belt conveyors are 14" wide and are of the indexing type which operate in response to control signals generated by the automatic flash removing apparatus 10 or other equipment which can be used in conjunction with the automatic flash removing apparatus 10. A pair of guide rails 100 are disposed along one edge of the belt conveyors 96 and 98 in the preferred embodiment, these guide rails 100 are adjustible and prior to operation of the apparatus 10, they are adjusted to be in substantial alignment with the second fixed heated platen 76, as shown in FIG. 2. When properly aligned, the guide rails 100 will support the rear surface of the battery cell container in the proper position such that the second fixed heated platen 76 and second movable heated platen 78 properly remove the flash as will be subsequently explained. Disposed along the opposite side of the first and second conveyors 96 and 98 is a second set of guide rails 102. The second set of guide rails 102 are preferably adjustable with respect to the first set of guide rails 100 such that the spacing between the two sets is sufficient to accommodate different size battery cell containers which can be processed through the automatic flash removing apparatus 10.

Figure 3:
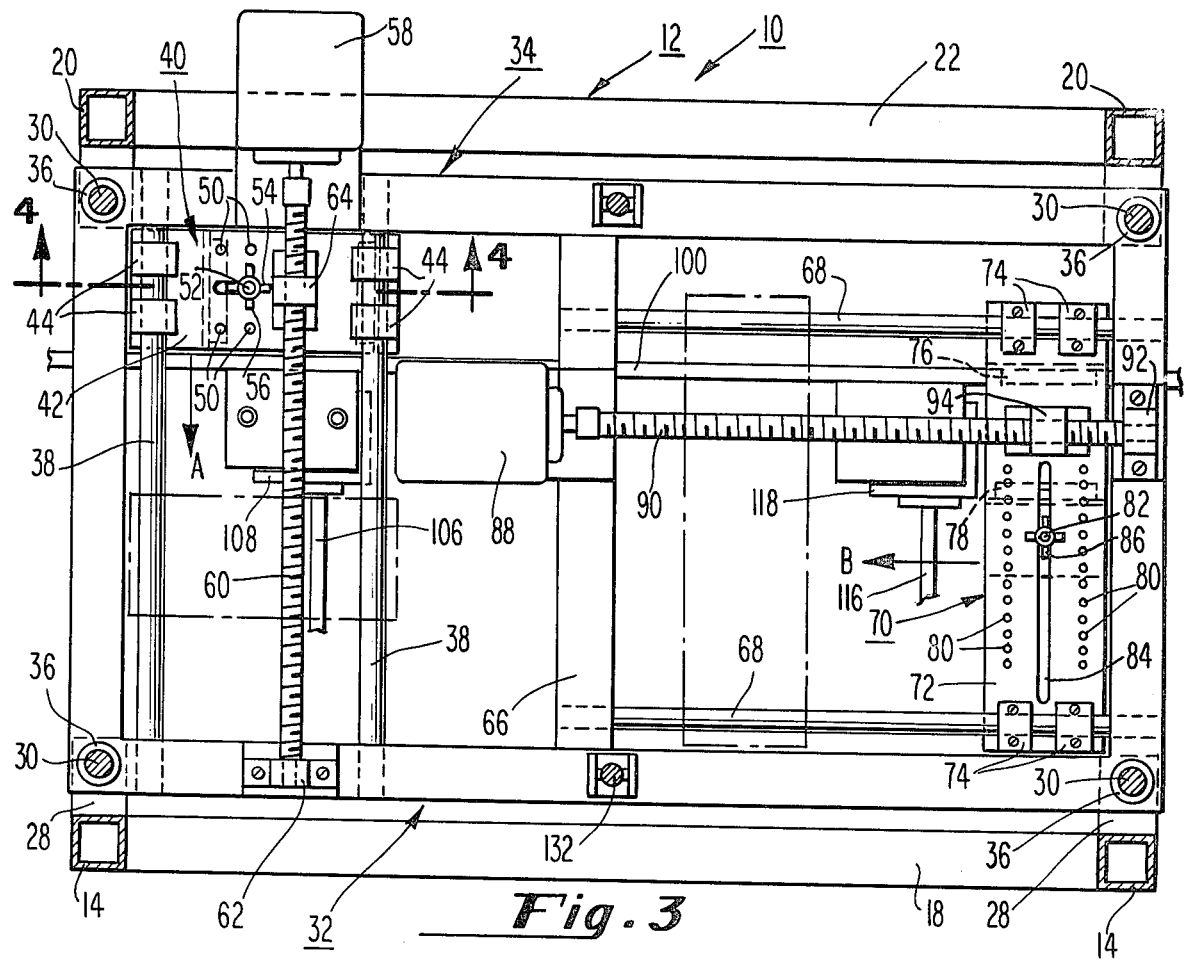
FIG. 3 is a sectional view taken along lines 3—3 of FIG. 1.
Figure 4:
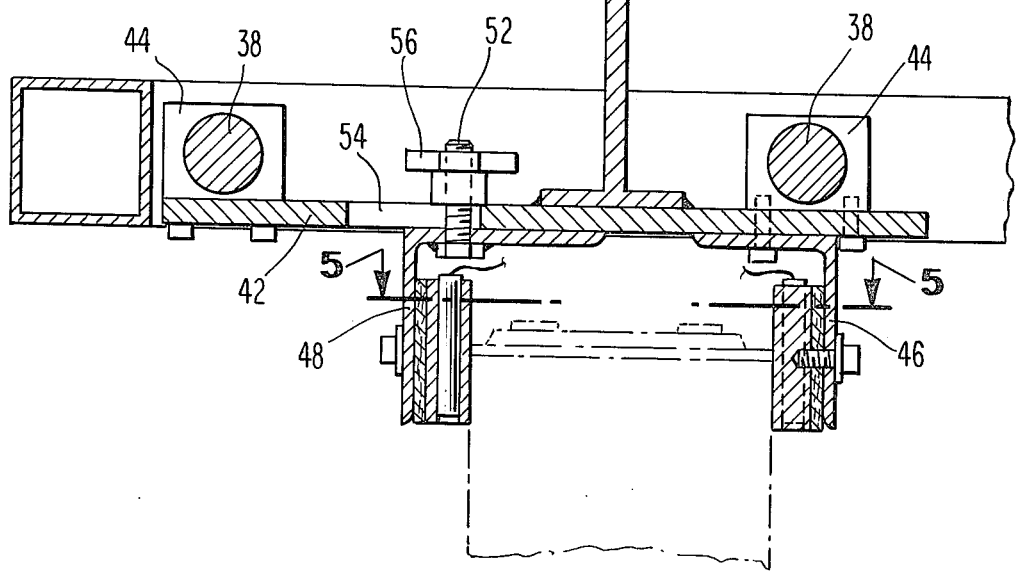
FIG. 4 is a sectional view taken along lines 4—4 of FIG. 3.

A first guide clamp assembly, designated generally 104, is disposed adjacent the first belt conveyor 96 on the opposite side thereof from the first set of guide rails 100. The first guide clamp assembly 104 comprises a first double acting pneumatic cylinder (not shown) having a pneumatically operated plunger 106 extending therefrom toward the guide rails 100. A first L-shaped clamp member 108, having two substantially perpendicular inner surfaces, one parallel to and the other perpendicular with respect to guide rails 100 as shown in FIG. 3, is attached to the terminal end of the plunger 106. The first pneumatic cylinder is rigidly attached to a suitable frame means 110 which permits the first L-shaped clamp 108 member to assume a predetermined, fixed position with respect to the first platen head 40. In this predetermined, fixed position, the inner surface of the clamp 108 which is perpendicular to the guide rails 100 will support the leading surface of the battery cell container in the proper position such that the first fixed heated platen 46 and first moveable heated platen 48 properly remove the flash as will be subsequently explained.

A second guide clamp assembly, designated generally 112, is disposed adjacent the second belt conveyor 98 on the opposite side thereof from the guide rails 100. The second guide clamp assembly 112 comprises a double acting pneumatic cylinder 114 having a pneumatically operated plunger 116 extending therefrom toward the guide rails 100. A second L-shaped clamp member 118, having two substantially perpendicular inner surfaces, one parallel to and the other perpendicular with respect to the guide rails 100, as shown in FIG. 3, is attached to the terminal end of the plunger 116. The pneumatic cylinder 114 is rigidly attached to the frame means 110 which supports the cylinder 116 in fixed position with respect to the second platen head 70 and the guide rails 100.

The automatic flash removing apparatus 10 also includes means for adjusting the vertical position of the main head 32. This vertical adjustment means includes a third reversible electric motor 120 mounted on the rear top lateral frame member by suitable means such as bolts which connects the motor to a motor support platform 122 which is welded to the rear top lateral frame member. The shaft of the third reversible electric motor 120 is rigidly coupled to a drive shaft 124 which is connected between and in driving engagement with first and second jack screws 126 and 128 respectively. The first jack screw 126 is rigidly attached to the rear top lateral frame member and the second jack screw 128 is rigidly attached to the front top lateral frame member 16. One end of a first threaded vertical adjustment rod 130 is rigidly attached to the rear of the main head frame 34 in substantially the center thereof. The other end of the first threaded vertical adjustment rod 130 is threadingly engaged by the first jack screw 126 whereby rotation of the jack screw in one direction will cause the first threaded vertical adjustment rod 130 to be drawn upward while rotation in the other direction will cause the rod to be lowered. One end of a second threaded vertical adjustment rod 132 is rigidly attached to the front of the main head frame 34 in substantially the middle thereof. The other end of the second threaded vertical adjustment rod 132 is threadedly engaged by the second jack screw 128 whereby rotation of the second jack screw in one direction causes the second threaded vertical adjustment rod 132 to be drawn upward and rotation in the opposite direction causes the rod to be lowered.

The first and second jack screws, 126 and 128, incorporate right angle drives whereby rotation of the drive shaft 124 by the third reversible electric motor 120 in a first direction will cause both jack screws to turn in the same direction by the same amount thereby drawing the first and second threaded vertical adjustment rods, 130 and 132, upward, for example. Similarly, rotation of the drive shaft 124 in the opposite direction by the third reversible electric motor 120 will cause the first and second rods, 130 and 132, to lower. Since both rods 130 and 132 are rigidly connected to the mainframe, which in turn is able to slide vertically along the vertical guide shafts 30, rotation of the drive shaft 124 in a first direction by the third reversible electric motor 120 will cause the mainframe to move in a first vertical direction, for example upward while rotation of the drive shaft 124 in the opposite direction will cause the main head frame 34 to move downward.

The automatic flash removing apparatus 10 of the present invention operates as follows. Industrial battery lead-acid cell containers, having covers heat sealed thereto, are conveyed by the first belt conveyor 96 into position under the first platen head 40 in the direction indicated by arrow "C" in FIG. 1 and are guided by the guide rails 100 and 102. As the cell moves into the first operating position, as illustrated by battery cell 134 in FIG. 1, it is sensed by a position sensor (not shown) of any suitable type known in the art, for example an electric trip switch which is used in the preferred embodiment. The sensor then sends out a signal to the first guide clamp assembly 104 which causes the pneumatic cylinder to operate and extend the pneumatically operated plunger 106 with the first clamp member 108 disposed on the end thereof toward the guide rails 100. The movement of the first belt conveyor 96 causes the leading surface of the cell 134 to seat against the inner surface of the first L-shaped clamp member 108 which is perpendicular to the guide rails 100, while the movement of the clamp member 108 toward the guide rails 100 causes the inner surface thereof which is parallel to the guide rails 100 to engage front surface of the cell 134. The pneumatic cylinder ultimately urges the cell 134 against the guide rails 100 and maintains the cell 134 in this position. Since the first clamp member 108 have been pre-aligned with respect to the first platen head 40 as previously described, the cell 134 is therefore in the proper position with respect to the first heated platens 46 and 48.

Figure 5:
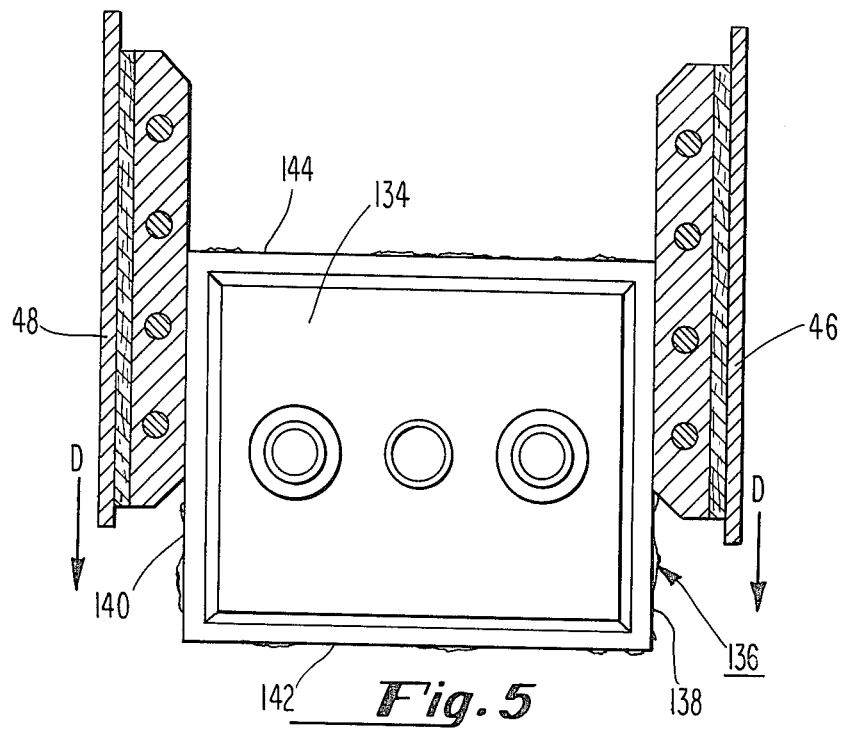
FIG. 5 is a sectional view taken along lines 5—5 of FIG. 4.

After a predetermined time delay to ensure a proper clamp, for example three seconds in the preferred embodiment, the first belt conveyor 96 is stopped and the first reversible electric motor 58 is energized causing the first set of heated platens 46 and 48 to pass along the leading and trailing surfaces of the welded cell, removing all of the excess flash from the weld beads on these surfaces. This first flash removal operation is shown in more detail in FIG. 5. The flash, generally designated 136, is shown protruding from the welds along the leading surface 138, the trailing surface 140, the front surface 142 and the rear surface 144 of the lead-acid battery cell 134. As shown in FIG. 5, the first and second heated platen, 46 and 48, are driven along the leading and trailing surfaces, 138 and 140 respectively, smoothing out the flash 136 that protrudes from the welds along the surfaces. As depicted in FIG. 5, the heated platens 46 and 48 melt the flash 136 by virtue of their elevated temperatures and impress this molten flash back up against the weld due to the contact of the heated platens 46 and 48 with the leading and trailing surfaces of the container 134.

After a predetermined time delay to ensure that the heated platens 46 and 48 have been driven completely over the leading and trailing surfaces of the cell 134, for example eighteen seconds in the preferred embodiment, power to the first reversible electric motor 58 is shut off, the platens 46 and 48 having been driven to a non-interferring standby position; the pneumatic cylinder will retract the plunger 106 causing the first clamp member 108 to withdraw from engagement with the cell container 134 to a home position, and the first belt conveyor 96 is then restarted. As a result, the cell 134 resumes movement in the direction indicated by arrow "C" in FIG. 1 toward the second belt conveyor 98.

The second belt conveyor 96, conveys the cell in the direction indicated by arrow "C" in FIG. 1, the cell being guided by the guide rails 100 and 102. As the cell moves into the second operating position, as illustrated by battery cell 146 in FIG. 1, it is sensed by a second position sensor (not shown) of any suitable type known in the art, for example and electric trip switch is used in the preferred embodiment. The second sensor then sends out a signal to the second guide clamp assembly 112 which causes the second pneumatic cylinder 114 to operate and extend the pneumatically operated plunger 116 with the second clamp member 118 disposed on the end thereof toward the guide rails 100. The movement of the second belt conveyor 98 causes the leading surface of the cell 146 to seat against the surface of the second L-shaped clamp 118 which is perpendicular to the guide rails 100 while the movement of the clamp 118 toward the guide rails 100 causes the surface of the clamp member 118 which is parallel to the rails 100 to engage the front surface of the cell 146. The pneumatic cylinder 114 ultimately urges the cell 146 against the guide rails 100 and maintains the cell in this position. Since the guide rails 100 and the second clamp member 118 are pre-aligned with respect to the second platen head 70, the cell 146 is therefore in proper position.

After a predetermined time delay to ensure a proper clamp, for example three seconds in the preferred embodiment, the second belt conveyor 98 is stopped and the second reversible electric motor 88 is energized causing the second set of heated platens, 78 and 76 to pass along the front and rear surfaces, 142 and 144 respectively, of the cell 146. The removal of the flash protruding from the front and rear surfaces, 142 and 144, by the second set of heated platens 78 and 76 is similar to that described for the leading and trailing surfaces 138 and 140 and shown in FIG. 5.

After a predetermined time delay to ensure that the second set of heated platens 78 and 76 have completed the flash removal process along the front and rear surfaces 142 and 144 and have cleared the cell 146, for example approximately ten seconds in the preferred embodiment, power to the second reversible electric motor 88 will be shut off, the second pneumatic cylinder 114 will retract the plunger 116 causing the second clamp member 118 to withdraw from engagement with the cell container 146 to a home position, and the second belt conveyor 98 will then restart. The cell 146 then resumes movement in the direction indicated by arrow "C" in FIG. 1 out of the automatic flash removing apparatus 10. As the cell clears the apparatus, it is sensed by a position sensor (not shown) of any suitable type known in the art, for example and electric trip switch is used in the preferred embodiment. This sensor then sends out a signal which causes power to be applied to the second reversible electric motor 88 in order to drive the second set of heated platens 76 and 78 in the opposite direction to a home position. After a predetermined time delay, approximately ten seconds in the preferred embodiment, the power to the second reversible electric motor 88 will be shut off, whereby the second set of heated platens 76 and 78 are held in their home position ready to receive a new cell.

Figure 6:
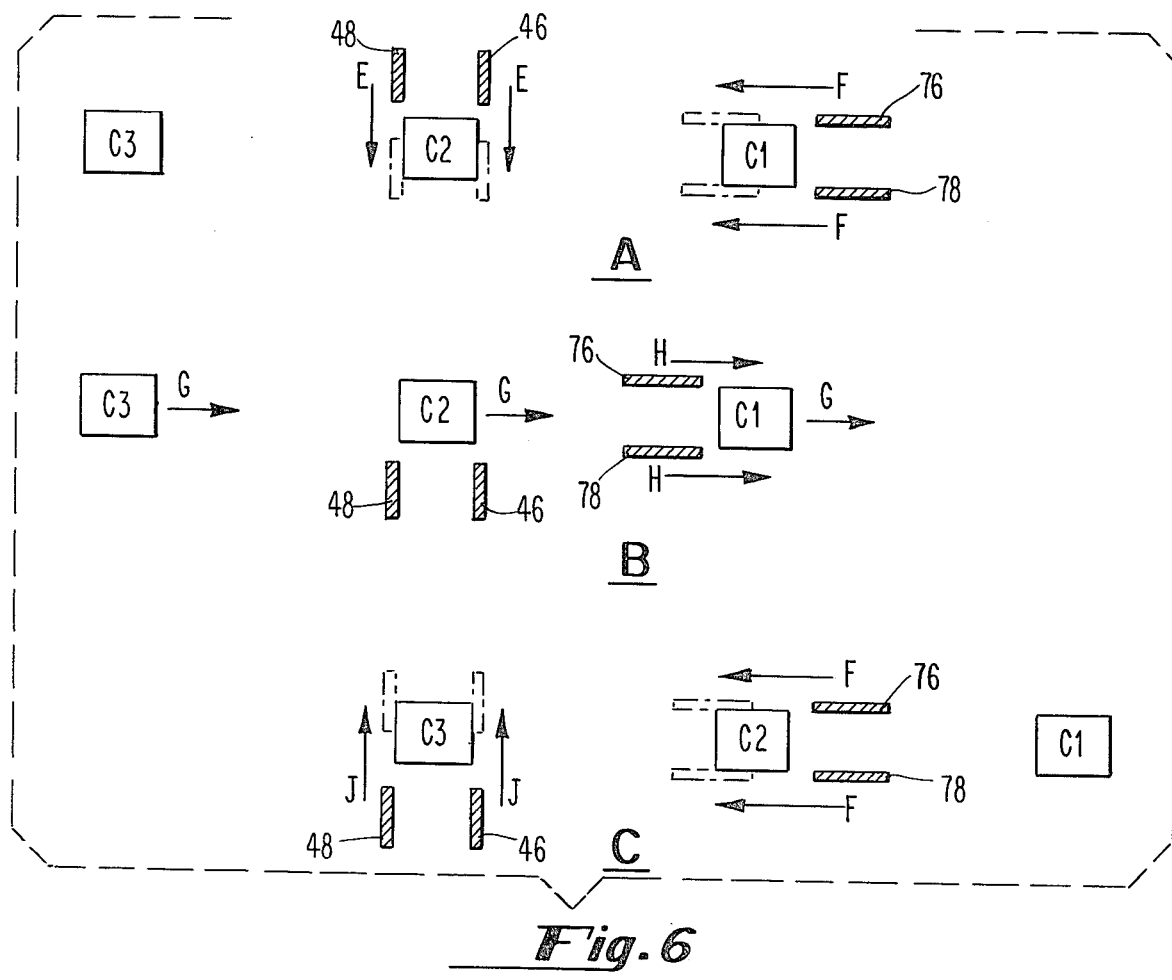
FIG. 6 is a schematic depiction of the method of operation of spaced, heated platens of the apparatus of the present invention.

FIG. 6 depicts a schematic representation of the operation of the first pair of heated platens, 46 and 48 and the second pair of heated platens 76 and 78 and their relationship to cells, identified as C1, C2 and C3, in various positions with respect to the automatic flash removing apparatus 10. In the top row "A" shown in FIG. 6, cell C1 is depicted in the second operating position which is the proper, pre-aligned position with respect to the second platen head 70; cell C2 is depicted in the first operating position which is the proper, pre-aligned position with respect to the first platen head 70; and cell C3 is depicted in position on the first belt conveyor 96 ready to be transported to the first operating position. As shown in FIG. 6A, the second set of heated platens 76 and 78 are in their home position, adjacent the leading surface of the cell C1. At the proper time, as previously described, the second set of heated platens 76 and 78 will remove the flash from the beads along the rear and front surfaces of the cell C1 by traveling along these surfaces from the leading surface to the trailing surface as indicated the arrows "F". Also at the proper time, as previously described, the first set of heated platens 46 and 48 will travel from a home position, for example that indicated in FIG. 6A adjacent the rear surface of cell C2, along the leading and trailing surfaces of the cell C2 from the rear to the front as shown by arrows "E".

FIG. 6B shows the positions of the first and second set of heated platens at the conclusion of their respective flash removing operations. At this time, the first and second belt conveyors 96 and 98, move the cells C1, C2 and C3 in the direction indicated by the arrows "G" in FIG. 6B. During this movement, the first set of heated platens 46 and 48 remain in a second home position, adjacent the front surface of cell C2 as shown in FIG. 6B. The second set of heated platens 76 and 78 follow the cell C1 in the direction indicated by the arrows "H" to their home position which is shown in FIGS. 6A and 6C. FIG. 6C shows the cells C1, C2 and C3 in their subsequent positions with C3 in the first operating position, C2 in the second operating position and C1 in position on the second belt conveyor 98 ready to be transported to a subsequent processing station. At the proper time, the first set of heated platens 46 and 48 will remove flash from the beads along the leading and trailing surfaces of the cell C3 by traveling from the second home position to the first home position as indicated by the arrows "J". The second set of heated platens 76 and 78 will remove the flash from the beads along the rear and front surfaces of cell C2 by traveling from their home position in the direction indicated by the arrows "F". Upon completion of the flash removal operations, the first set of heated platens 46 and 48 will remain in the first home position, as depicted in FIG. 6A, while the second set of heated platens 76 and 78 will return to their home position as previously described. From the preceeding description, it is apparent that the first pair of heated platens 46 and 48 assume either one of two home positions as depicted in FIG. 6 while the second pair of heated platens 76 and 78 always return to the same home position which is adjacent the leading surface of a cell in the second position as depicted in FIG. 6.

As previously stated, the dimensions of industrial lead-acid battery cells may vary from type to type. In view of these possible variations in dimensions, a novel and advantageous feature of the automatic flash removing apparatus 10 is its ability to accommodate various size cells. The adaptability to accommodate various size cells is accomplished by virtue of three features of the apparatus 10.

First, the variation in the height dimension between cell types is accommodated by the use of the third reversible electric motor 120 to raise and lower the main head frame 34 to the proper vertical height above the belt conveyors 96 and 98, as previously described. Second, variation in the width dimension between different cell types is accommodated by spacing the second pair of guide rails 102 from the first pair of guide rails 100 in accordance with the dimension of the particular cell to be processed as well as varying the spacing between the second set of heated platens 76 and 78 by moving the second moveable heated platen 78 as previously described. Third, variations in dimensions between the leading and trailing surfaces of different cell types is accommodated by adjusting the spacing between the first and second heated platens 46 and 48 as previously described.

It will be understood that various changes in the details, materials and arrangements of the parts which have been herein described and illustrated in order to explain the nature of this invention, may be made by those skilled in the art within the principle and scope of the invention as expressed in the following claims.

What is claimed is:

1. An apparatus for automatically removing flash from a plastic weld bead formed by heat sealing a cover to a container of a lead-acid battery cell, said apparatus comprising:
    a. flash removing means including at least one platen head having a pair of platens separated by a fixed, predetermined spacing, each platen having a heated surface;
    b. means for positioning said battery cell in an operating position in which said cell is in predetermined spaced relation from said pair of spaced platens; and
    c. means for moving said spaced platens along said cell so that the heated surfaces of the platens slidingly engage the weld bead disposed along opposing surfaces of said positioned cell.

2. An apparatus for automatically removing flash from a plastic weld bead formed by heat sealing a cover to a container of a lead-acid battery cell, said apparatus comprising:
    a. flash removing means including at least one heated surface;
    b. means for positioning said battery cell in an operating position adjacent said heated surface; and c. means for moving said heated surface along said weld bead so that said heated surface slidingly engages said weld bead, whereby flash from said weld bead is smoothed out and pushed back against the weld bead, and thereby removed.

3. An apparatus for automatically removing flash from a plastic weld bead formed by heat sealing a cover to a container of a lead-acid battery cell, said apparatus comprising:
   a. flash removing means including at least one platen head having a pair of spaced platens, each platen having a heated surface;
   b. means for positioning said battery cell in an operating position in which said cell is in predetermined spaced relation to said platen head; and
   c. means for moving said platen head along said cell so that the heated surface of each platen slidingly engages the weld bead disposed along a surface of said positioned cell.

4. The invention of claim 3 wherein said battery cell positioning means comprises:
   a. means for conveying the battery cell, in at least one direction along a processing line, into said operating position;
   b. means for guiding the movement of said cell along said processing line, said means being aligned with respect to said platen head; and
   c. clamp means for clamping said cell against said guide means in an operating position adjacent said spaced platens wherein a surface of said cell is in substantially coplanar alignment with the heated surface of a respective platen.

5. The invention of claim 4 wherein said flash removing means includes two platen heads, slideably mounted on a main head frame, a first platen head being positioned adjacent a first operating position, said first platen head being moveable in a lateral direction which is substantially perpendicular to said processing line; and a second platen head being positioned adjacent a second operating position, said second platen head being moveable in a longitudinal direction substantially parallel to said processing line.

6. The invention of claim 5 wherein said main head frame is slideably mounted on a main frame, said main head frame being vertically moveable with respect to said conveying means.

7. The invention of claim 6 additionally comprising means for adjusting the vertical distance between said platen heads and said conveying means.

8. The invention of claim 3 wherein said vertical distance adjusting means comprises:
   a. a first reversible electric motor mounted on said main frame and having a rotatable shaft;
   b. at least one jack screw mounted on said main frame and coupled to said motor shaft whereby rotation of the motor shaft causes a corresponding rotation of the jack screw; and
   c. a threaded rod connected to said main head frame and threadingly engaging said jack screw whereby rotation of said jack screw in one direction raises the main head frame with respect to said conveying means and rotation of said jack screw in an opposite direction lowers the main head frame with respect to said conveying means.

9. The invention of claim 5 wherein said first platen head comprises a first fixed heated platen and a first moveable heated platen mounted on a first head plate with said heated surfaces in substantially parallel, facing relationship with each other and substantially perpendicular to said processing line, said first moveable heated platen being moveable with respect to said first fixed heated platen whereby the fixed distance between said parallel, facing heated surfaces is adjustible.

10. The invention of claim 9 wherein said means for moving said first platen head comprises:
   a. a second reversible electric motor mounted on said main head frame and having a rotatable shaft;
   b. a threaded bushing attached to said first platen head; and
   c. a threaded rod coupled to said motor shaft and threadingly engaging said threaded bushing whereby rotation of said motor shaft in one direction drives said first platen head in a first direction along said lateral direction and rotation of said motor shaft in an opposite direction drives said first platen head along said lateral direction in a second direction opposite said first direction.

11. The invention of claim 5 wherein said second platen head comprises a second fixed heated platen and a second moveable heated platen mounted on a second head plate with said heated surfaces in substantially parallel, facing relationship with each other and said processing line, said second moveable heated platen being moveable with respect to said second fixed heated platen whereby the fixed distance between said parallel, facing heated surfaces is adjustable.

12. The invention of claim 11 wherein said means for moving said second platen head comprises:
   a. a third reversible electric motor mounted on said main head frame and having a rotatable shaft;
   b. a threaded bushing attached to said second platen head; and
   c. a threaded rod coupled to said motor shaft, and threadingly engaging said threaded bushing whereby rotation of said motor shaft in one direction drives said second platen head in a first direction along said longitudinal direction and rotation of said motor shaft in an opposite direction drives said second plate head along said longitudinal direction in a second direction opposite said first direction.

* * * * *